United States Patent
Wong

(10) Patent No.: US 7,306,646 B2
(45) Date of Patent: Dec. 11, 2007

(54) UTILIZATION OF COMPRESSOR SURGE CONTROL AIR IN AN AIRCRAFT ON-BOARD INERT GAS GENERATING SYSTEM

(75) Inventor: Kenneth K. Wong, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 215 days.

(21) Appl. No.: 10/973,374

(22) Filed: Oct. 26, 2004

(65) Prior Publication Data

US 2005/0223895 A1    Oct. 13, 2005

Related U.S. Application Data

(60) Provisional application No. 60/560,547, filed on Apr. 8, 2004.

(51) Int. Cl.
*B01D 53/22* (2006.01)
(52) U.S. Cl. .......................................................... 95/45
(58) Field of Classification Search ................... 95/45, 95/54; 96/4, 7, 8; 55/385.1; 244/135 R
See application file for complete search history.

(56) References Cited

U.S. PATENT DOCUMENTS

| | | | |
|---|---|---|---|
| 3,922,149 A | 11/1975 | Ruder et al. | |
| 4,556,180 A | 12/1985 | Manatt | |
| 4,681,602 A * | 7/1987 | Glenn et al. | 95/47 |
| 4,944,776 A | 7/1990 | Keyser et al. | |
| 5,069,692 A * | 12/1991 | Grennan et al. | 96/4 |
| 5,470,379 A | 11/1995 | Garrett | |
| 5,829,272 A * | 11/1998 | Barry | 62/655 |
| 6,012,533 A * | 1/2000 | Cramer | 169/45 |
| 6,360,730 B1 * | 3/2002 | Koethe | 123/541 |
| 6,458,190 B2 | 10/2002 | Dolle et al. | |
| 6,491,739 B1 | 12/2002 | Crome et al. | |
| 6,913,636 B2 * | 7/2005 | Defrancesco et al. | 95/8 |
| 2002/0117052 A1* | 8/2002 | Beers | 95/54 |
| 2002/0162915 A1* | 11/2002 | Mitani | 244/118.5 |
| 2004/0226438 A1* | 11/2004 | Jones | 95/45 |
| 2005/0092177 A1* | 5/2005 | Bonchonsky et al. | 95/138 |
| 2005/0115404 A1 | 6/2005 | Leigh et al. | |

OTHER PUBLICATIONS

U.S. Appl. No. 60/560,547, Kenneth E. Wong, Utilization of Compressor Surge Control Air in an Aircraft On-Board Inert Gas Generating System, filed Apr. 8, 2004.

* cited by examiner

*Primary Examiner*—Frank M. Lawrence
(74) *Attorney, Agent, or Firm*—Christopher H. Hunter

(57) ABSTRACT

Improvements in aircraft on-board inert gas generating systems wherein generally excess or surplus compressed airflow from a radial flow centrifugal compressor, produced in order to keep the compressor from surging in predetermined "reduced speed/reduced pressure ratio" operating modes, is utilized for at least one of driving a turbofan for conditioning the air separator module inlet air, or warming up/heating an air separator module in the inert gas generating system, thereby utilizing at least some of the energy of this excess/surplus compressed air that would otherwise be wasted. Several preferential operational methods and structural systems are set forth.

17 Claims, 3 Drawing Sheets

UTILIZATION OF COMPRESSOR SURGE CONTROL AIR IN AN AIRCRAFT ON-BOARD INERT GAS GENERATING SYSTEM

CROSS-REFERENCE TO RELATED CASES

The present application claims the benefit of the filing date of U.S. Provisional Application Ser. No. 60/560,547; filed Apr. 8, 2004, the disclosure of which is expressly incorporated herein by reference.

FIELD OF THE INVENTION

The present invention pertains to the use of compressor excess surge control air for at least one of driving a turbofan in the aircraft cabin and warming/heating up air separator modules within an aircraft on-board inert gas generating system.

BACKGROUND OF THE INVENTION

For safe aircraft operation, there is a need to provide an inert or combustibly inert material, such as Nitrogen Enriched Air (NEA) for filling, void space in the fuel tanks in order to maintain the required amount of fuel pressure in the fuel tanks while concurrently minimizing all chances of fire within the fuel tanks. One example for providing such an inert gas is to utilize an On-Board Inert Gas Generating System (OBIGGS) wherein combustibly inert gas is produced by processing engine bleed air or aircraft cabin air with an inert gas generator, which is a gas or Air Separation Module (ASM), preferably based on a selectively Permeable Membrane (PM) technology.

The ASM consists of hollow fiber bundles packaged in a cylindrical shell, with an inlet and an outlet, generally at opposite ends, and a shell side vent port. Commercially available polymeric fiber gas separation membrane technology is employed. Briefly, when pressurized air passes through the hollow fibers, via the ASM inlet, oxygen is separated out by diffusion through the fiber walls and exits through the shell-side vent port. The remaining NEA flows out of the ASM via the outlet port and is distributed to the ullages of the aircraft fuel tanks for the purpose of flammability reduction or irritating of the fuel tanks. The diffusion fibers operate most efficiently, in terms of selectivity of oxygen over nitrogen (ratio of their respective permeability) at a specific temperature, which is higher than ambient.

In most commercial aircraft, the compressed air for NEA generation originates from either engine bleed air or from cabin air, wherein, in the latter case, a separate motor driven OBIGGS radial flow centrifugal compressor compresses the cabin air to a higher pressure. In both cases, the hot compressed air is cooled by an OBIGGS heat exchanger to a temperature optimal for ASM fiber performance. A consistent remaining problem is that during aircraft cruise condition, the amount of OBIGGS airflow through the ASM is very low, such that the air traveling through the fibers can easily be quenched by the relatively cold ASM shell, at a high altitude ambient environment. Therefore, it is beneficial, from an air separation performance standpoint, to keep the ASM shell warm by utilizing external means.

In an electrically pressurized OBIGGS system, using air compressed by a motor-driven radial flow centrifugal compressor, this compressor has to operate within a wide range of flow rates and pressure ratios in order to satisfy the variable flow demands under various flight conditions. A motor controller controls the compressor to operate at different speeds. In order to prevent the compressor from surging at low flow demand conditions, such as during cruise operation, the compressor design flow rate is deliberately increased over the ASM flow demand. The excess compressed air has been disposed of by exhausting same into the OBIGGS bay of the aircraft via a surge relief valve at the heat exchanger outlet, located upstream of the ASM. Thus, the energy required to compress this excess amount of air is essentially wasted.

The patent literature includes a rather large number of systems and methods for processing a supply gas having two or more components for obtaining a product gas enriched in one of such components and include: U.S. Pat. No. 3,922,149 to Ruder et al.; U.S. Pat. No. 4,556,180 to Manatt; U.S. Pat. No. 4,681,602 to Glenn et al; U.S. Pat. No. 4,944,776 to Keyser et al.; U.S. Pat. No. 5,470,379 to Garrett; U.S. Pat. No. 6,458,190 B2 to Dolle et al.; U.S. Pat. No. 6,491,739 B1 to Crome et al. None of the cited references excess pressurized air, available from a radial flow centrifugal compressor to keep the ASM warm when the aircraft cruises at high altitude and low ambient temperature. The present invention also optimizes the performance of the ASM by maintaining the temperature of the ASM at the optimal operating temperature, as well as to utilize the energy of this compressor, which is otherwise wasted, if not used. As will become clear hereinafter, the energy of the excess air is also additionally utilized for driving a turbofan for conditioning the ASM inlet air during certain operating conditions.

SUMMARY OF THE INVENTION

Accordingly, in order to overcome the deficiencies of the prior art devices, the present invention provides several methods for utilizing surplus or excess compressed elevated temperature air produced in an aircraft on-board inert gas generating system, together with improved structural systems for carrying out the several methods.

Specifically, in one method of the invention, in an aircraft, the method for utilizing surplus compressed elevated temperature air produced in an inert gas generating system, comprises: a. initially directing hot air, from a compressor source thereof, through a heat exchanger within the system; b. further directing warm air, from the heat exchanger, into an entry point of an air separator module within the system; c. utilizing at least some of the heat energy of the warm air for warming up the air separator module; and d. thereafter exhausting the warm air from an exit point of the air separator module.

In another method of the invention, in an aircraft, the method for utilizing surplus compressed hot air produced in an inert gas generating system, comprises: a. directing the hot air, from a source thereof, into the inlet side of a turbofan turbine; b. utilizing at least some of the energy of the hot air for driving the turbofan for heat exchanger cooling purposes; and c. exhausting the warm air from an exit side of the turbine.

In a further method of this invention, in an aircraft, the method for utilizing excessive compressed hot air produced in an inert gas generating system, comprises: a. directing the hot compressed air, from a source thereof, into an inlet side of a turbofan turbine; b. utilizing at least some of the energy of the hot compressed air for driving the turbofan for heat exchanger cooling purposes; c. exhausting the warm compressed air from an exit side of the turbine; d. further directing the warm compressed air to an entry point of an air separator module within said system; e. utilizing additional energy of the warm compressed air for warming up the air separator module; and f. finally exhausting the warm compressed air from an exit point of the air separator module.

In yet another method of the invention, the method utilizes excess compressed warm air, produced in an aircraft on-board gas generating system, wherein the method comprises the steps of: a. initially directing the hot air from a compressor source thereof through a heat exchanger within the system, b. further directing warm air, from the heat exchanger, into an entry port of an air separator module within the system; then c. utilizing heat energy of the warm air for warming the air separator module; and finally d. exhausting the warm air from an exit port of the air separator module.

In still a further method of the invention, the method utilizes excess compressed hot air, produced in an aircraft on-board inert gas generating system, wherein the method comprises the steps of: a. directing the hot air, from a source thereof, into an inlet side of a turbofan turbine; b. utilizing energy of the compressed hot air for driving the turbofan for heat exchange purposes while the aircraft is on the ground and/or operating at low altitudes; and c. exhausting the warm compressed air from an exit side of the turbine. In a variation thereof, this method further includes the steps of: d. further directing the warm compressed air to an entry port of an air separator module within the system; e. utilizing the heat energy of the warm compressed air for warming the air separator module; and f. finally exhausting the warm compressed air from an exit port of the separator module.

In a differing method of the invention, the method utilizes surplus compressed air, at an elevated temperature, produced in an aircraft on-board inert gas generating system, wherein the method comprises: a. directing the air, from a compressor source thereof within the system, into at least one of an inlet side of the turbine of an ASM inlet air cooling turbofan and an entry port of an air separator module (ASM) within the system; b. utilizing at least some of the energy of the compressed air for at least one of driving the turbofan for conditioning purposes and for warming the air separator module; and c. exhausting the compressed air from at least one of an exit side of the turbine and an exit port of the separator module. In one variation thereof, this method further includes initially directing the compressed air to the inlet side of the turbine. In another variation thereof, this method further includes, initially directing the surplus compressed air from the compressor source thereof through a heat exchanger within the system, and thereafter utilizing heat energy of the compressed air for at least one of warming up and maintaining a predetermined temperature operating range within the air separator module. In a further variation thereof, this method further includes sequentially directing the compressed air to the inlet side of the turbine and the entry port of the air separator module.

Specifically, in terms of structural systems, in one embodiment of this invention, in an aircraft, on-board inert gas generating system, includes; a. a source of aircraft cabin air; b. a motor-driven radial flow centrifugal compressor, having an input side connected with the source of cabin air, for compressing the cabin air and thereby raising the temperature thereof to a first temperature range, the compressor concomitantly producing a first, variable airflow portion while also producing a second, generally excess, airflow portion in order to keep the compressor from surging in certain predetermined operating modes; c. a heat exchanger, having an upstream side thereof connected with an,output side of the compressor, for reducing the temperature of the compressed air first and second airflow portions to a second temperature range; and d. an air separator module of the permeable membrane type, utilizing multiple parallel membrane bundles encased within an outer shell portion, having an input port operatively interconnected with a downstream side of the heat exchanger, for receiving and separating the first airflow portion of the second temperature range compressed air into nitrogen enriched air and oxygen enriched air, wherein the improvement comprises: e. the addition, of a conduit, also connecting the heat exchanger downstream side with the air separator module outer shell portion, for directing the second, excess, airflow portion of the second temperature compressed air over and around the multiple membrane bundles, thereby utilizing at least some of the heat energy of the second, generally excess, airflow portion of the second temperature range compressed air for performing at least one of warming up and maintaining a predetermined temperature operating range within the air separator module, before exiting from the shell portion. In a variation of this embodiment, the improved aircraft on-board inert gas generating system, further includes a surge valve, operatively interposed in the conduit, for controlling the flow of the second, generally excess, airflow portion of the second temperature compressed air to the air separator module outer shell portion. In this embodiment the second, generally excess, airflow portion is available since the specific flow rate and pressure requirement for the first variable airflow portion for the air separator module fall outside of the performance envelope of a radial flow centrifugal compressor because, for the pressure requirement thereof for the on-board inert gas generating system, the associated specific flow rate demand for separation in the air separator module is outside of the lower boundary of the performance envelope thereof; therefore, a radial flow centrifugal compressor always produces a second, generally excess, airflow, not needed by the air separator module, which is thus utilized in the manner set forth.

In another embodiment of the invention, an aircraft, in an on-board inert gas generating system, includes: a. a source of aircraft cabin air; b. a motor-driven radial flow centrifugal compressor, having an input side connected with the source of cabin air, for compressing the cabin air and thereby raising the temperature thereof to a first temperature range, the compressor concomitantly producing a first variable airflow portion while also producing a second, excess, airflow portion in order to keep the compressor from surging in certain predetermined operating modes; c. a heat exchanger, having an upstream side thereof connected with an output side of the compressor, for reducing the temperature of the compressed air first airflow portion to a second temperature range; and d. an air separator module of the permeable membrane type, utilizing multiple, parallel, membrane bundles encased in an outer shell portion, having an input port operatively interconnected with a downstream side of the heat exchanger, for receiving and separating the airflow first portion of the second temperature compressed air into nitrogen enriched air and oxygen enriched air, wherein the improvement comprises: e. the addition of a conduit, connecting an upstream side of the heat exchanger with the inlet side of a turbofan turbine, for directing the second, excess, airflow portion of the first temperature compressed air to the turbine for driving the turbofan for heat exchanger cooling purposes, thereby utilizing at least some of the energy of the second, excess, airflow portion first temperature compressed air. A variation of this embodiment further includes a surge valve, operatively interposed in the conduit, for controlling the flow of the second, excess airflow portion of the first temperature compressed air to the turbofan turbine. A further variation of this embodiment includes the addition of a further conduit, connecting the outlet of the turbofan turbine with the air separator module outer shell portion, for further directing the second, excess, airflow portion of the first temperature compressed air over and around the multiple membrane bundles, thereby utilizing additional energy of the second, excess, airflow portion first temperature compressed air for performing at least one of warming up and maintaining a predetermined temperature operating range within the separator module, before exiting from the shell portion.

In yet a further embodiment of this invention, an aircraft, in an on-board inert gas generating system, includes: a. a source of aircraft cabin air; b. a motor-driven radial flow centrifugal compressor, having an input side connected with the source of cabin air, for compressing the cabin air and thereby raising the temperature thereof to a first temperature range, the compressor concomitantly producing a first variable airflow portion while also producing a second, excess, airflow portion in order to keep the compressor from surging during certain predetermined operating modes; c. a heat exchanger, having an upstream side thereof connected with an output side of the compressor, for reducing the temperature of the compressed air first airflow portion to a second temperature range; and d. an air separator module of the permeable membrane type, utilizing multiple, parallel membrane bundles encased within an outer shell portion, having an input port operatively interconnected with a downstream side of the heat exchanger, for receiving and separating the airflow first portion of the second range compressed air into nitrogen enriched air and oxygen enriched air, wherein the improvement comprises: e. the addition of a first conduit, connecting an upstream side of the heat exchanger with the inlet side of a turbofan turbine, for directing the second, excess, airflow portion of the first temperature compressed air to the turbine for driving the turbofan for heat exchanger cooling purposes, thereby utilizing at least some of the energy of the second, excess, airflow portion first temperature compressed air; and f. the addition of a second conduit, connecting the outlet of the turbofan turbine with the air separator module outer shell portion, for further directing the second, excess, airflow portion of the first temperature compressed air over and around the multiple membrane bundles, thereby utilizing additional energy of the second, excess, airflow portion first temperature compressed air for performing at least one of warming up and maintaining a predetermined temperature operating range within the air separator module, before exiting from the shell portion. A variation of this embodiment further includes a surge valve, operatively interposed in the first conduit, for controlling the flow of the second, excess airflow portion of the first temperature compressed air to the turbofan turbine.

In a still differing embodiment of this invention, an aircraft, in an on-board inert gas generating system, includes: a. a source of aircraft cabin air; b. a motor-driven radial flow centrifugal compressor, having an input side connected with the source of cabin air, for compressing the cabin air and thereby raising the temperature thereof to a first temperature range, the compressor concomitantly producing a first, variable airflow portion while also producing a second, excess, airflow portion in order to keep the compressor from surging in certain predetermined operating modes; c. a heat exchanger, having an upstream side thereof connected with an output side of the compressor for reducing the temperature of at least the compressed air first airflow portion to a second temperature range; and d. an air separator module of the permeable membrane type, utilizing multiple parallel membrane bundles encased within an outer shell portion, having an input port operatively interconnected with the downstream side of the heat exchanger, for receiving and separating the first airflow portion of the second temperature range compressed air into nitrogen enriched air and oxygen enriched air, wherein the improvement comprises: e. the addition of at least one conduit, connecting at least one of the heat exchanger downstream side with the air separator module outer shell portion, for directing the second, excess airflow portion of the second temperature compressed air over and around said multiple membrane bundles, and connecting an upstream side of the heat exchanger with the inlet side of, a turbofan turbine, for directing said second, excess, airflow portion of the first temperature compressed air to the turbine for driving the turbofan for heat exchanger cooling purposes, thereby utilizing at least some of the energy of the excess airflow portions for at least one of warming up/maintaining a predetermined temperature operating range within the air separator module and for driving the turbofan. A variation of this embodiment further includes a surge valve, operatively interposed in one of the at least one conduits for controlling the flow of one of the excess flow portions.

In still another embodiment of this invention, in an aircraft, an on-board inert gas generating system, includes: a. a source of aircraft cabin air; and b. a motor-driven radial flow centrifugal compressor, having an input side connected with the source of cabin air, for compressing the cabin air and thereby raising the temperature thereof to a first predetermined temperature range, the compressor producing a first variable airflow portion while concurrently producing a second, excess, airflow portion in order to keep the compressor from surging in certain predetermined operating ranges, wherein the improvement comprises: c. the addition of a conduit, connecting an output side of the compressor with the inlet side of a turbofan turbine, for directing the second, excess, airflow portion of the compressed air to the turbine for driving the turbofan for heat exchanger cooling purposes, thereby utilizing at least some of the energy of the second, excess, airflow portion. In a variation of this embodiment, the system further includes: d. a heat exchanger, having an upstream side thereof also connected with the output side of said compressor, for reducing the temperature of said compressed air first airflow portion to a second temperature range; and e. an air separator module of the permeable membrane type, utilizing multiple, parallel membrane bundles encased within an outer shell portion, having an input port operatively interconnected with a downstream side of the heat exchanger, for receiving and separating the airflow first portion of the second range compressed air into nitrogen enriched air and oxygen enriched air, wherein the improvement further comprises: f. the addition of a further conduit, connecting the outlet side of the turbofan turbine with the air separator module outer shell portion, for further directing the second, excess, airflow portion of the first temperature compressed air over and around the multiple membrane bundles, thereby utilizing additional energy of the second, excess, airflow portion first temperature compressed air for performing at least one of warming up and maintaining a predetermined temperature operating range within the air separator module, before exiting from the shell portion. A first variation of this embodiment further includes a surge valve, operatively interposed in at least one of the conduits, for controlling the flow of the second excess, airflow portion of the first temperature compressed air.

The previously described advantages and features, as well as other advantages and features, will become readily apparent from the detailed description of the preferred embodiments that follows.

BRIEF DESCRIPTION OF THE DRAWINGS

The several embodiments of the present invention are illustrated by way of example, and not by limitation, in the several figures of the accompanying drawings, with elements having the same reference numeral designations representing like elements throughout the specification.

DETAILED DESCRIPTION OF THE INVENTION

Prior to proceeding with the best mode for carrying out the several embodiments of this invention, those skilled in the art will recognize that OBIGGS is also an umbrella term that fully encompasses the following specific subsets or equivalents thereof, namely:

FRS—Flammability Reduction System;
NES—Nitrogen Enrichment System; and
NGS—Nitrogen Generating System.

Figure 1:
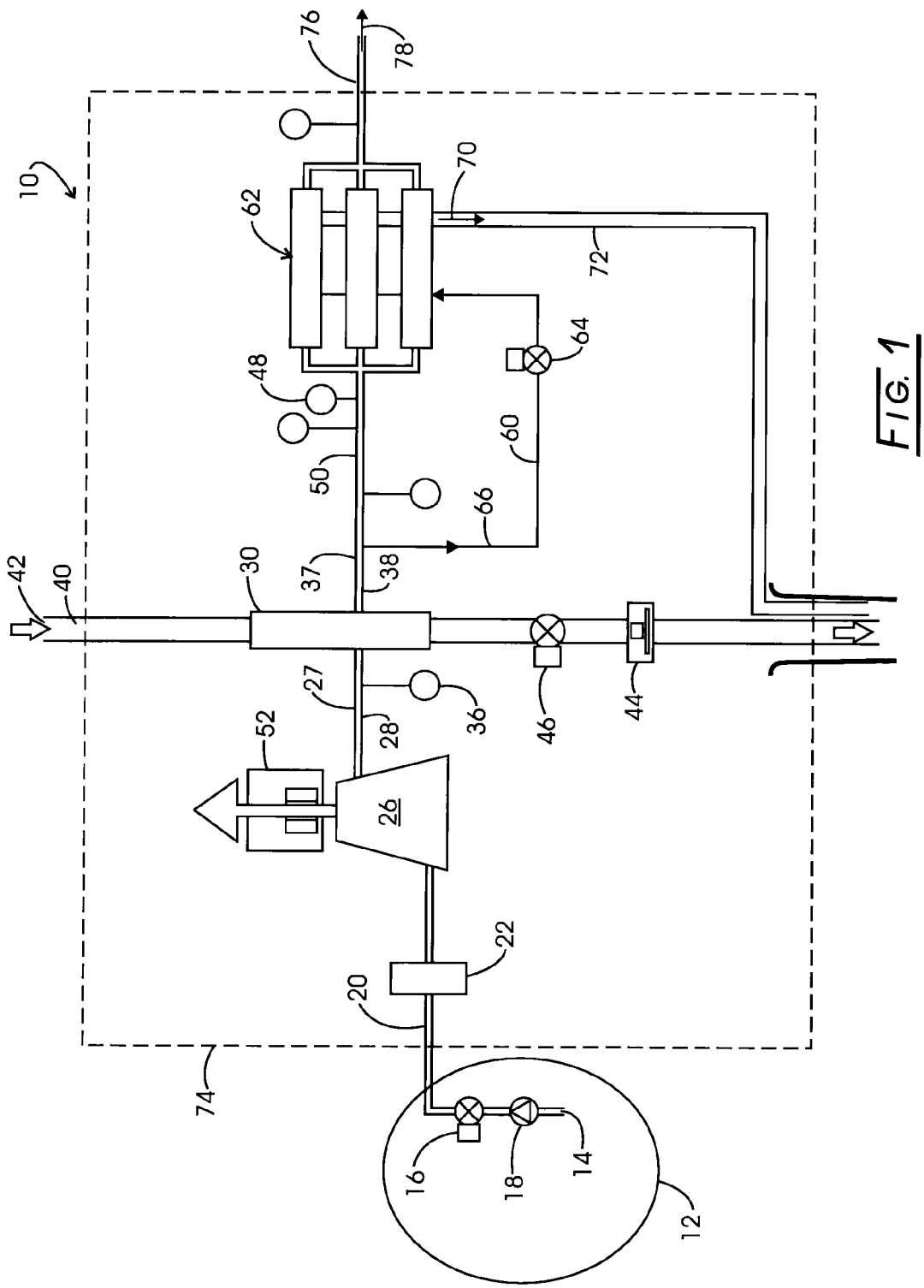
FIG. 1 is a schematic representation of a first embodiment of an aircraft OBIGGS (Onboard Inert Gas Generating System) that utilizes generally excess or surplus compressor airflow to warm an ASM (Air Separation Module).

Referring now to the several drawings, and particularly to FIG. 1, schematically depicted therein is a first embodiment 10 of an OBIGGS that utilizes excess or surplus compressor airflow to warm an ASM. Specifically, when the aircraft is to initiate the operation of OBIGGS, a cabin isolation shut-off valve 16 is commanded to open. At the same time, a motor driven radial flow centrifugal compressor 26 is actuated to draw cabin air 14, via inlet line 20 and cabin air check valve 18, from aircraft cabin 12. A compressor motor controller (not shown) commands the motor 52 to operate at variable speeds, which deliver predetermined discharge pressures, utilizing a pressure closed loop feedback. Specific compressor pressure ratios and flow rates are set at various flight conditions—e.g. during taxi, climb, cruise, approach and descent, in a manner known to those skilled in the art. The motor controller algorithm will resolve any short-term transient conditions.

Compressor 26, preferably powered by an electric brushless DC-motor 52, draws cabin air 14, via inlet line 20, through a HEPA filter 22 in order to remove undesirable particles, such as dirt and hair, etc. Then, the now filtered cabin air 14 flows into the suction chamber of radial flow centrifugal compressor 26, from which the resulting hot and compressed air 27, at a first elevated temperature, is discharged through insulated tubing or conduit 28 into a plate-finned cross-flow heat exchanger 30 cooled by ram air 40. Pressure sensor 36, monitors this exit parameters of compressor 26.

Ram air flow 40 for the OBIGGS heat exchanger is deemed to be available from a separate source, such as OBIGGS ram air duct 42, or share with the ECS ram air duct (not shown). Ram airflow 40 is controlled via a modulating valve 46 for all in-air flight conditions. Ram airflow 40 regulation is based on the outlet temperature of the air exiting from heat exchanger 30, with this temperature being monitored by temperature sensor 48, in conduit 38. This maintains the temperature of the compressor outlet air at a predetermined, desired, temperature range for optimal air separation performance. Ram air modulating valve 46 and the speed of an on-ground cooling fan 44, located downstream of valve 46, are regulated to control the temperature of the air exiting from the outlet of heat exchanger 30 during operations on the ground.

Compressed hot air 27 passes through heat exchanger 30 and is reduced in temperature to compressed warm air 37, at a second elevated temperature, before entering, via line 38, as a first variable airflow portion 50 therein, into a known permeable membrane (PM) type ASM 62, which, in FIG. 1, is comprised, e.g. of readily commercially-available multiple parallel ASM bundles. A surge control valve 64 is located downstream of heat exchanger 30 to direct generally excess airflow, as a second, surplus, warm airflow portion 60, in a line 66, from compressor 26 to warm the ASM modules. Specifically, surge control valve 64 is located in branch line 66 that extends from line 38, downstream of heat exchanger 30 in order to avoid the leakage of compressed hot air 27 into the OBIGGS bay, to and into the shells of the several ASM bundles 62, in a manner well known in the art. Generally excess or surplus airflow rate is intrinsically required by the compressor design in order to keep centrifugal compressor 26 from surging in the "reduced speed/reduced pressure ratio" operating modes. Thus, excess airflow is generally available and it is this excess airflow capacity and the heat energy contained therein that are utilized, rather than being discarded, for the dual purpose of both maintaining the desired ASM temperature range and also preventing moisture condensation from forming in the ASM shells. These dual purposes accomplished by flowing/blowing the generally excess surge warm airflow over the ASM fiber bundles in a manner well known in the art. Thus, compressor 26 concomitantly produces a first, variable, warm airflow portion 50 while also producing a second, generally excess or surplus, warm airflow portion 60 in order to keep the compressor from surging under certain predetermined operating modes. Specifically, this second, excess or surplus, airflow 60 is generally available since the specific flow rate and pressure requirement for the first variable airflow portion 50 for the air separator module fall outside of the performance envelope of a radial flow centrifugal compressor because, for the pressure requirements thereof for the on-board gas generating system, the associated specific flow rate demand for separation in the air separator module is outside of the lower boundary of the noted performance envelope thereof; therefore, a radial flow centrifugal compressor always produces a second, generally excess or surplus, airflow 60, not needed by the air separator module, which is thus utilized in the manner already set forth or to be set forth hereinafter.

The now-pressurized and conditioned warm air 37 then enters, via line 38, as the first variable airflow -portion 50, into the ASM bundles 62 which consist of known "oxygen-affinitive" fibers, whereby OEA diffuses through the fiber walls and is channeled, via conduit 72, to the ventilated ambient atmosphere of the OBIGGS pack bay 74. The remaining throughput, namely NEA 78, exiting from the ASM bundles 62 via conduit or line 76, is distributed into the fuel tank ullage (not shown) in a manner well known in the art. It should be understood that the required NEA flow rate is at its maximum during the aircraft descent due to the requirement to equalize the ullage pressure with the increasing ambient pressure as well as to minimize the outside air (21% oxygen) from entering into the ullage. As is well known in the art, the second, excess airflow 60, after flowing over, around and heating or warming up the ASM bundles, is comingled with OEA and thereupon exhausted from the ASM.

Figure 2:
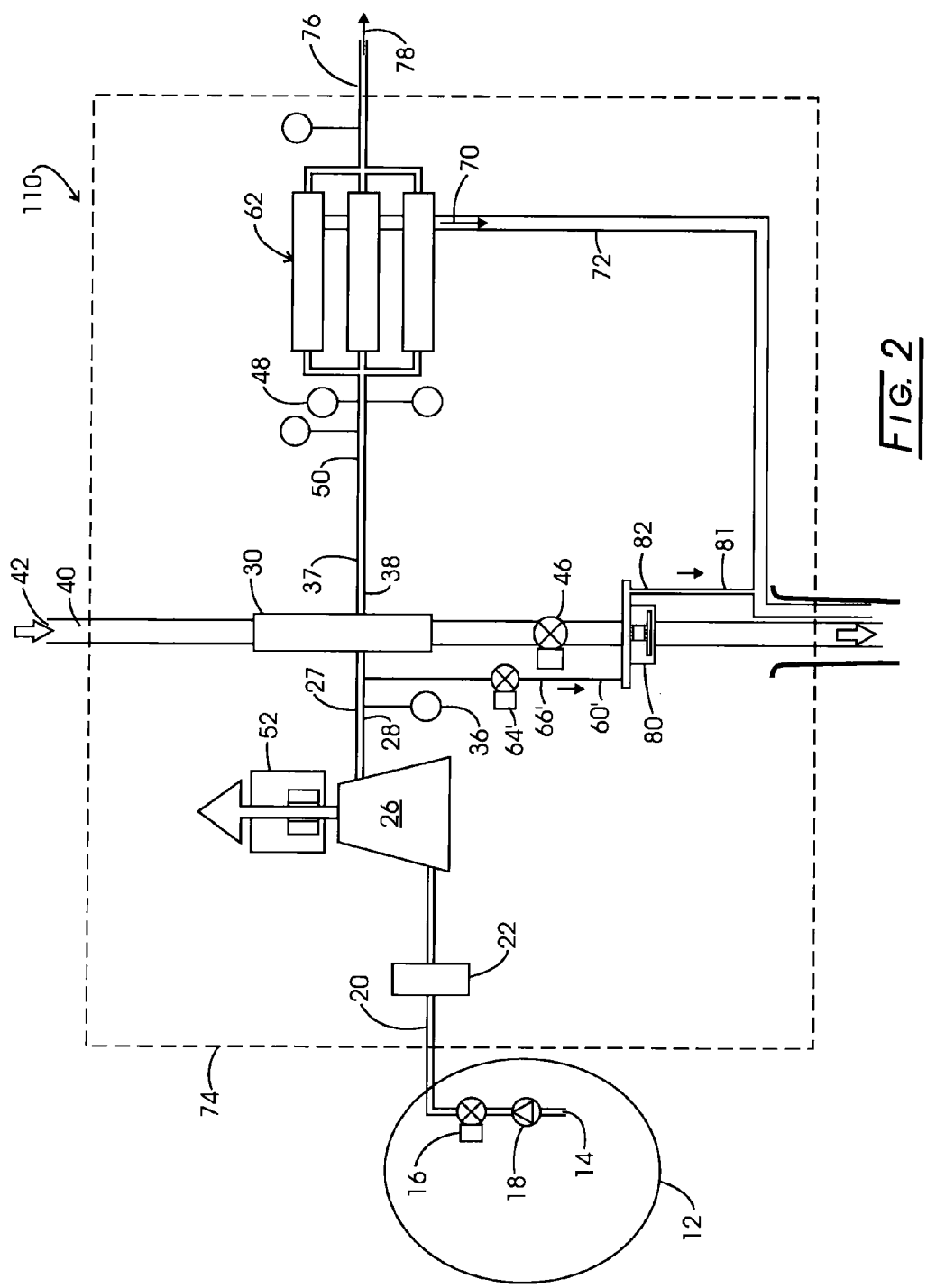
FIG. 2 is a schematic representation of a second embodiment of an aircraft OBIGGS that utilizes generally excess or surplus compressor airflow to drive a turbofan for on-ground and/or low altitude heat exchanger cooling purposes.

Turning now to FIG. 2, schematically depicted therein is a second embodiment 110 of an OBIGGS that utilizes the generally excess or surplus compressor second airflow portion to drive a turbofan for heat exchanger cooling purposes. The system/structural components of FIG. 2 are substantially similar to those of FIG. 1, with like numerals applying to like parts, except that the FIG. 1 surge valve 64 and branch line 66 have been relocated such that line 66', containing surge valve 64', now branches off insulated tubing 28, upstream of primary heat exchanger 30 and now conducts hot air 60' in order to maximize the available energy, and has its other end operatively connected with an input side of a turbofan 80. The output side of turbofan 80, which is utilized for on-ground and/or low altitude heat exchanger cooling purposes, is connected, via conduit 82, with OEA line 72. Again, the previously noted excess compressor airflow capacity is utilized, prior to being discarded, for driving turbofan 80, rather than utilizing a separate electric motor for providing this driving force. This utilization of the excess compressor airflow saves both energy and weight. It should be understood that the second airflow portion 60 exiting from the turbine of turbofan 86, as warm air 81, is now, of course, cooler due to the expansion process.

Figure 3:
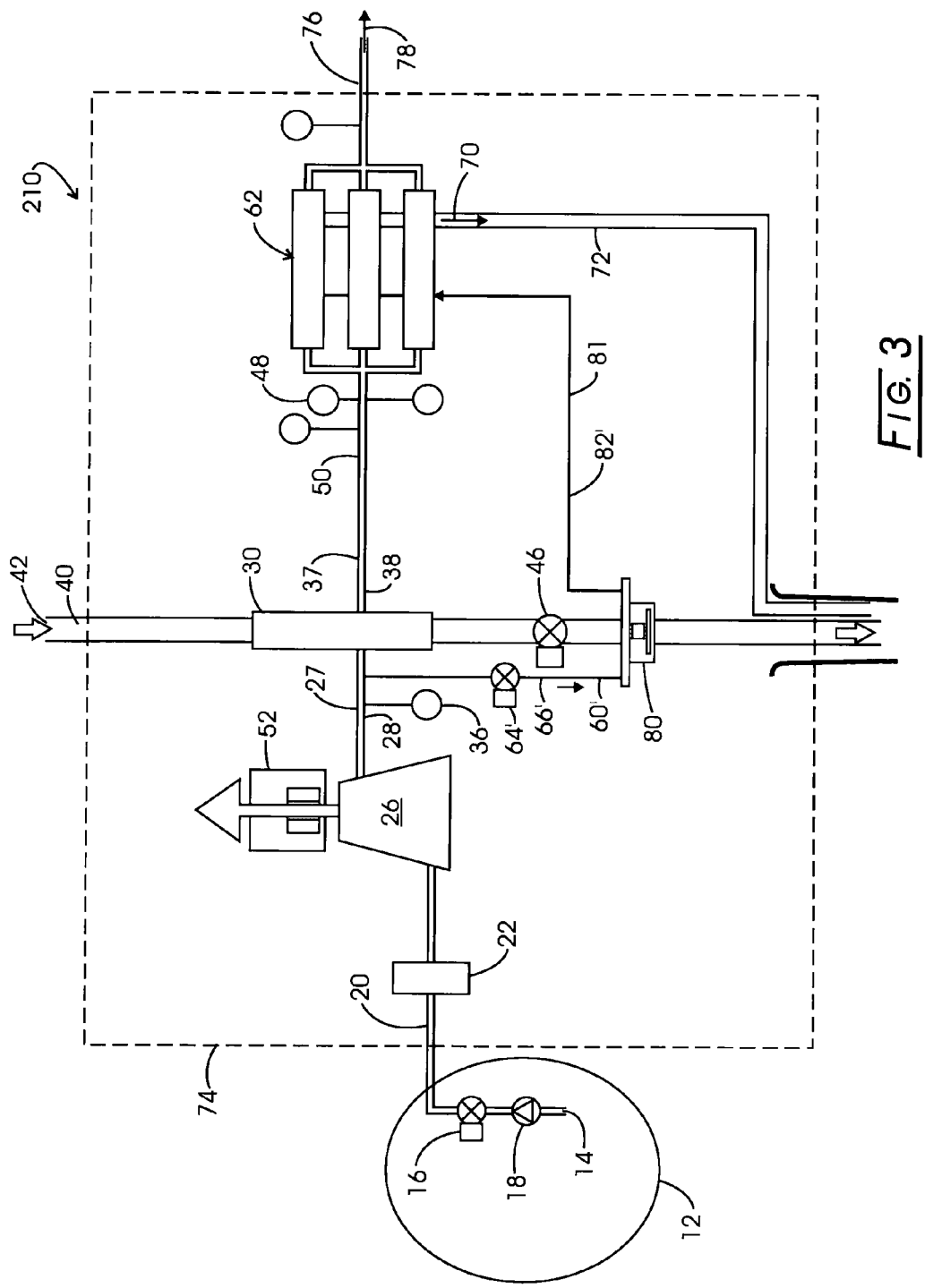
FIG. 3 is a schematic representation of a third embodiment of an aircraft OBIGGS that utilizes generally excess or surplus compressor airflow to alternately and/or simultaneously drive a turbofan and warm an ASM.

Finally turning to FIG. 3, schematically depicted therein is a third embodiment 210 of an OBIGGS that further utilizes the generally excess or surplus compressor second airflow portion 60', that exits from turbofan 80, as warm compressed air 81, is now utilized to warm the ASM in second embodiment 110 in FIG. 2. The system/structural components of FIG. 3 are substantially similar to those of FIG. 2, again with like numerals being applied to like parts, with line 82, being relocated as line 82', from the output side of turbofan 80 to the shells of the several ASM bundles 62. Thus, in this embodiment 210, the compressor excess second airflow capacity, as warm compressed air 81, and the heat energy contained therein, exiting from turbofan 80, are additionally utilized for the dual purpose of both maintaining the desired ASM temperature range as well as preventing moisture condensation from forming in the ASM shells in the manner already previously set forth relative to the operation of first embodiment 10 in FIG. 1 Thereafter, the OEA is channeled to the ventilated atmosphere of OBIGGS pack bay 74 in the manner already described. Thus, the system/structure of FIG. 3 essentially represents a combination of embodiments 10 and 110 of FIGS. 1 and 2, respectively, i.e. the tandem use of compressor generally excess second airflow capacity to drive a turbofan as well as warming and dehumidifying the ASM.

It is deemed that one of ordinary skill in the art will readily recognize that the present invention fills remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. In an aircraft, a method for utilizing surplus compressed elevated temperature air produced in an inert gas generating system, said method comprising:

a. initially directing hot air, from a compressor source, thereof, through a heat exchanger within said system;

b. cooling said hot air to warm air within said heat exchanger and further directing a first non-surplus portion of said warm air, from said heat exchanger, and through the interiors of multiple permeable membrane bundles encased within an outer shell portion of an air separator module within said system;

c. additionally directing a second surplus portion of said warm air into said outer shell portion of said air separator module and around the outer peripheries of said membrane bundles, thereby utilizing at least some of the heat energy of said second portion of said warm air for further warming said air separator module; and d. thereafter exhausting said second surplus portion of said warm air from said outer shell portion of said air separator module.

2. In an aircraft, a method for utilizing excessive compressed hot air produced in an inert gas generating system, said method comprising:

a. directing said excess hot compressed air, from a source thereof, into an inlet side of a turbofan turbine;

b. utilizing at least some of the energy of said excess hot compressed air for driving said turbofan for heat exchange cooling purposes, thereby cooling said excess hot air to warm air;

c. exhausting said warm compressed air from an exit side of said turbine;

d. further directing said warm compressed air into an outer shell portion and around the outer peripheries of multiple permeable membrane bundles located in an air separator module within said system;

e. utilizing additional energy of said warm compressed air for further warming said air separator module; and f. finally exhausting said warm compressed air from an exit point of said air separator module.

3. A method for utilizing an excess portion of compressed warm air, produced in an aircraft on-board gas generating system, said method comprising the steps of:

a. initially directing hot compressed air, from a compressor source thereof, through a heat exchanger within said system;

b. reducing the temperature of said hot compressed air to warm air within said heat exchanger and further directing a non-excess portion of said now warm compressed air, from said heat exchanger, into and through the interiors of multiple permeable membrane bundles encased within an outer shell of an air separator module within said system; while c. additionally directing an excess portion of said now warm air into an entry port of said outer shell portion and around the outer peripheries of said membrane bundles, thereby utilizing heat energy of said warm compressed air for further warming said air separator module; and finally d. exhausting said excess portion of said warm compressed air from an exit port of said outer shell portion of said air separator module.

4. A method for utilizing excess compressed hot air, produced in an aircraft on-board inert gas generating system, said method comprising the steps of:

a. directing said excess hot compressed air, from a source thereof, into an inlet side of a turbofan turbine;

b. utilizing energy of said excess compressed hot air for driving said turbofan for heat exchange purposes while said aircraft is on the ground and/or operating at low altitudes, thereby reducing the temperature of said excess hot air to warm air;

c. exhausting said warm compressed air from an exit side of said turbine and further directing said warm compressed air to an entry port in an outer shell portion of an air separator module and around the outer peripheries of multiple permeable membrane bundles situated within said air separator module located within said system;

d. utilizing the heat energy of said warm compressed air for warming said separator module; and e. finally exhausting said warm compressed air from an exit port in said outer shell portion of said separator module.

5. A method for utilizing surplus compressed air, at an elevated temperature, produced in an aircraft on-board inert gas generating system, said method comprising:

a. directing said surplus air, from a compressor source thereof within said system, into at least one of an inlet side of an aircraft cabin turbofan and an entry port of an outer shell of an air separator module within said system, said surplus air flowing around the outer peripheries of multiple permeable membrane bundles encased within said outer shell portion;

b. utilizing at least some of the energy of said surplus compressed air for at least one of driving said turbofan for cooling purposes and for further warming said air separator module; and c. exhausting said surplus compressed air from at least one of an exit side of said turbine and an exit port of said separator module outer shell portion.

6. The method for utilizing surplus compressed air, at an elevated temperature, of claim 5, further including, initially directing said surplus compressed air from said compressor source thereof through a heat exchanger within said system, and thereafter utilizing heat energy of said surplus compressed air for at least one of further warming and maintaining a predetermined temperature operating range within said air separator module.

7. The method for utilizing surplus compressed air, at an elevated temperature, of claim 5, further including sequentially directing said compressed air to the inlet side of said turbine and the entry port of said outer shell of said air separator module.

8. In an aircraft, an on-board inert gas generating system, including:

a. a source of aircraft cabin air;

b. a motor-driven radial flow centrifugal compressor, having an input side connected with said source of cabin air, for compressing said cabin air and thereby raising the temperature thereof to a first temperature range, said compressor concomitantly producing a first, variable airflow portion while also producing a second, generally excess, airflow portion in order to keep said compressor from surging in certain predetermined operating modes;

c. a heat exchanger, having an upstream side thereof connected with an output side of said compressor, for reducing the temperature of said compressed air first and second airflow portions to a second temperature range; and d. an air separator module of the permeable membrane type, utilizing multiple parallel membrane bundles encased within an outer shell portion, having an input port operatively interconnected with a downstream side of said heat exchanger, for receiving and separating said first airflow portion of said second temperature range compressed air into nitrogen enriched air and oxygen enriched air, wherein the improvement comprises:

e. the addition of a conduit, also connecting said heat exchanger downstream side with said air separator module outer shell portion, for directing said second, generally excess, airflow portion of said second temperature compressed air over and around said multiple membrane bundles, thereby utilizing at least some of the heat energy of said second, excess, airflow portion of said second temperature range compressed air for performing at least one of warming up and maintaining a predetermined temperature operating range within said air separator module, before exiting from said shell portion.

9. The improved aircraft on-board inert gas generating system of claim 8, further including a surge valve, operatively interposed in said conduit, for controlling the flow of said second, generally excess, airflow portion of said second temperature compressed air to said air separator module outer shell portion.

10. The improved aircraft on-board inert gas generating system of claim 8, wherein said second, excess, airflow portion is available since the specific flow rate and pressure requirement for said first variable airflow portion for said air separator module fall outside of the performance envelope of a radial flow centrifugal compressor because, for the pressure requirement thereof for said on-board inert gas generating system, the associated specific flow rate demand for separation in said air separator module is outside of the lower boundary of said performance envelope thereof; therefore, a radial flow centrifugal compressor always produces a second, generally excess, airflow, not needed by said air separator module, which is thus utilized in the manner set forth.

11. In an aircraft, an on-board inert gas generating system, including:

a. a source of aircraft cabin air;

b. a motor-driven radial flow centrifugal compressor, having an input side connected with said source of cabin air, for compressing said cabin air and thereby raising the temperature thereof to a first temperature range, said compressor concomitantly producing a first variable airflow portion while also producing a second, generally excess, airflow portion in order to keep said compressor from surging in certain predetermined operating modes;

c. a heat exchanger, having an upstream side thereof connected with an output side of said compressor, for reducing the temperature of said compressed air first airflow portion to a second temperature range; and d. an air separator module of the permeable membrane type, utilizing multiple, parallel, membrane bundles encased in an outer shell portion, having an input port operatively interconnected with a downstream side of said heat exchanger, for receiving and separating said airflow first portion of said second temperature compressed air into nitrogen enriched air and oxygen enriched air, wherein the improvement comprises:

e. the addition of a conduit, connecting an upstream side of said heat exchanger with the inlet side of a turbofan turbine, for directing said second, generally excess, airflow portion of said first temperature compressed air to said turbine for driving said turbofan for heat exchanger cooling purposes, thereby utilizing at least some of the energy of said second, excess, airflow portion first temperature compressed air; said system further including a surge valve, operatively interposed in said conduit, for controlling the flow of said second, excess airflow portion of said first temperature compressed air to said turbofan turbine.

12. The improved aircraft on-board inert gas generating system of claim 11, further including the addition of a further conduit, connecting the outlet of said turbofan turbine with said air separator module outer shell portion, for further directing said second, generally excess, airflow portion of said first temperature compressed air over and around said multiple membrane bundles, thereby utilizing additional energy of said second, excess, airflow portion first temperature compressed air for performing at least one of warming up and maintaining a predetermined temperature operating range within said separator module, before exiting from said shell portion.

13. In an aircraft, an on-board inert gas generating system, including:
  a. a source of aircraft cabin air;
  b. a motor-driven radial flow centrifugal compressor, having an input side connected with said source of cabin air, for compressing said cabin air and thereby raising the temperature thereof to a first temperature range, said compressor concomitantly producing a first variable airflow portion while also producing a second, generally excess, airflow portion in order to keep said compressor from surging during certain predetermined operating modes;
  c. a heat exchanger, having an upstream side thereof connected with an output side of said compressor, for reducing the temperature of said compressed air first airflow portion to a second temperature range; and
  d. an air separator module of the permeable membrane type, utilizing multiple, parallel membrane bundles encased within an outer shell portion, having an input port operatively interconnected with a downstream side of said heat exchanger, for receiving and separating said airflow first portion of said second range compressed air into nitrogen enriched air and oxygen enriched air, wherein the improvement comprises:
  e. the addition of a first conduit, connecting an upstream side of said heat exchanger with the inlet side of a turbofan turbine, for directing said second, excess, airflow portion of said first temperature compressed air to said turbine for driving said turbofan for heat exchanger cooling purposes, thereby utilizing at least some of the energy of said second, generally excess, airflow portion first temperature compressed air; and
  f. the addition of a second conduit, connecting the outlet of said turbofan turbine with said air separator module outer shell portion, for further directing said second, generally excess, airflow portion of said first temperature compressed air over and around said multiple membrane bundles, thereby utilizing additional energy of said second, generally excess, airflow portion first temperature compressed air for performing at least one of warming up and maintaining a predetermined temperature operating range within said air separator module, before exiting from said shell portion.

14. The improved aircraft on-board inert gas generating system of claim 13, further including a surge valve, operatively interposed in said first conduit, for controlling the flow of said second, generally excess, airflow portion of said first temperature compressed air to said turbofan turbine.

15. In an aircraft, an on-board inert gas generating system, including:
  a. a source of aircraft cabin air;
  b. a motor-driven radial flow centrifugal compressor, having an input side connected with said source of cabin air, for compressing said cabin air and thereby raising the temperature thereof to a first temperature range, said compressor concomitantly producing a first, variable airflow portion while also producing a second, generally excess, airflow portion in order to keep said compressor from surging in certain predetermined operating modes;
  c. a heat exchanger, having an upstream side thereof connected with an output side of said compressor for reducing the temperature of at least said compressed air first airflow portion to a second temperature range; and
  d. an air separator module of the permeable membrane type, utilizing multiple parallel membrane bundles encased within an outer shell portion, having an input port operatively interconnected with the downstream side of said heat exchanger, for receiving and separating said first airflow portion of said second temperature range compressed air into nitrogen enriched air and oxygen enriched air, wherein the improvement comprises:
  e. the addition of at least one conduit, connecting at least one of the heat exchanger downstream side with said air separator module outer shell portion, for directing said second, generally excess airflow portion of said second temperature compressed air over and around said multiple membrane bundles, and connecting an upstream side of said heat exchanger with the inlet side of a turbofan turbine, for directing said second, generally excess, airflow portion of said first temperature compressed air to said turbine for driving said turbofan for heat exchanger cooling purposes, thereby utilizing at least some of the energy of said excess airflow portions for at least one of warming up/maintaining a predetermined temperature operating range within said air separator module and for driving said turbofan; said system further including a surge valve, operatively interposed in one of said at least one conduits for controlling the flow of said excess flow portions.

16. In an aircraft, an on-board inert gas generating system, including:
  a. a source of aircraft cabin air; and
  b. a motor-driven radial flow centrifugal compressor, having an input side connected with said source of cabin air, for compressing said cabin air and thereby raising the temperature thereof to a first predetermined temperature range, said compressor producing a first variable airflow portion while concurrently producing a second, generally excess, airflow portion in order to keep said compressor from surging in certain predetermined operating ranges, wherein the improvement comprises:
  c. the addition of a conduit, connecting an output side of said compressor with the inlet side of a turbofan turbine, for directing said second, generally excess, airflow portion of said compressed air to said turbine for driving said turbofan for heat exchanger cooling purposes, thereby utilizing at least some of the energy of said second, excess, airflow portion; said system further including:
  d. a heat exchanger, having an upstream side thereof connected with the output side of said compressor, for reducing the temperature of said compressed air first airflow portion to a second temperature range; and e. an air separator module of the permeable membrane type, utilizing multiple, parallel membrane bundles encased within an outer shell portion, having an input port operatively connected with a downstream side of said heat exchanger, for receiving and separating said airflow first portion of said second range compressed air into nitrogen enriched air and oxygen enriched air, wherein the improvement further comprises:

f. the addition of a further conduit, connecting the outlet side of said turbofan turbine with said air separator module outer shell portion, for further directing said second, generally excess, airflow portion of said first temperature compressed air over and around said multiple membrane bundles, thereby utilizing additional energy of said second, generally excess, airflow portion first temperature compressed air for performing at least one of warming up and maintaining a predetermined temperature operating range within said air separator module, before exiting from said shell portion.

17. The improved aircraft on-board inert gas generating system of claim 16, further including a surge valve, operatively interposed in at least one of said conduits, for controlling the flow of said second excess, airflow portion of said first temperature compressed air.

* * * * *